Patented July 9, 1946

2,403,450

UNITED STATES PATENT OFFICE 2,403,450

SYNTHETIC RESINS AND MANUFACTURE THEREOF

Paul D. Morton, Riverview, and John F. Olin, Grosse Ile, Mich., assignors to Sharples Chemicals Inc., Philadelphia, Pa., a corporation of Delaware No Drawing. Application November 10, 1942, Serial No. 465,164

2 Claims. (Cl. 260—70)

The present invention pertains to the manufacture of condensation products by the condensation of urea and urea derivatives with formaldehyde and equivalent methylene-containing bodies to produce resins, or analogous condensation products. Such condensation products may vary in consistency, and may be relatively hard products or relatively viscous liquids or soft solids, all of which will be referred to hereinafter as resinous condensation products.

A particular feature of the invention consists in the fact that it provides a product and process by which the resinous condensation products of the invention may be produced with control, both of the relative hardness of such products and of their solubility in organic solvents.

The present invention may be practiced with the aid of small amounts of acids as catalysts, or it may be practiced with the aid of alkaline catalysts. When simple urea is condensed with formaldehyde with the aid of such catalysts, the resulting resinous condensation products are relatively insoluble in organic solvents, unless special expedients to be discussed hereinafter are adopted to render them temporarily soluble. This fact limits the utility of such resinous condensation products in coating compositions and other applications. A further defect of such condensation products consists in the fact that condensation continues to occur slowly after the condensation product is embodied in the finished article of manufacture, such as a coating film or molded product, this continued condensation resulting in the formation of cracks and fissures in the product, and dulling and loss of gloss thereof.

In the prior patent of John F. Olin, 2,273,788, a process is disclosed for condensing formaldehyde with an alkyl urea such as an open chain- or cyclo-alkyl urea containing at least four substituent carbon atoms to produce resinous condensation products which are soluble in organic solvents in which the products of condensation of simple urea are insoluble, and which are of softer consistency than said prior art products. By adopting the procedure of that patent, a product may be obtained which is soluble in the organic vehicle desired for application of the resin, such as an aromatic hydrocarbon or other organic solvents. This result is accomplished by the simultaneous condensation of the higher alkyl urea (containing at least four substituent alkyl carbon atoms) with the formaldehyde and urea. If the higher alkyl urea is present in sufficient amount, the resulting condensation product will be soluble in the desired solvent. A limitation on the utility of these co-condensation products consists in the fact that the use of the higher alkyl urea to effect the desired solubility of the finished product necessarily entails production of a soft product as compared to the products of condensation of simple urea with formaldehyde. While a certain amount of softness in these products is often desirable, it is frequently necessary, in order to produce a product of the desired solubility, to include a proportion of the higher alkyl urea in the reaction mixture which causes these products to be softer than desired.

Another method which has been employed to render the condensation products of urea and formaldehyde at least temporarily soluble in organic solvents until heat is applied has been to effect at least a part of the condensation reaction in the presence of a monohydric aliphatic alcohol containing 3 or more carbon atoms. By maintaining such an alcohol in the condensation reaction mixture during the course of the condensation, a product is obtained which may be dissolved in the desired organic solvents. After solution in such solvent, and removal of the solvent by the application of heat, the products become insoluble and are thermoset. The use of the aliphatic alcohol in the condensation reaction serves to limit the degree of condensation and alter it in such a way as to produce an intermediate reaction product which can be dissolved in the desired organic solvent vehicle, and the condensation reaction proceeds upon removal of this vehicle by the application of heat in much the same manner as the initial condensation reaction would occur if conducted in the absence of such vehicle. While the practice of such a process solves the fundamental problem of providing a product which can be dissolved in a liquid vehicle used in its application as a coating, for example, this process has certain serious limitations. The resulting products are subject to certain of the same difficulties encountered in connection with condensation of urea with formaldehyde in the absence of the aliphatic alcohol, in that undesired condensation continues to occur after the solvent is removed, with resultant formation of cracks and fissures, and resulting dulling and loss of gloss. They are also subject to the difficulty that liberation of objectionable fumes of formaldehyde occurs, even after the solvent has been removed. A large degree of polymerization occurs during the course of the thermosetting operation in use of such products, with the result that a considerable loss in thickness of the applied films is entailed. The product is necessarily limited to a single type with respect to hardness, since the ultimate product after thermosetting is essentially similar to the product of condensation of simple urea with formaldehyde. As a consequence of this fact, it is impossible to control the hardness of the finished product in coatings and other applications to provide varying degrees of softness to correspond to the particular conditions required in the particular field of application.

Features of the present invention consist in the provision of a process and product by which all of the above disadvantages are avoided. The process and products of the present invention provide features by which the ultimate product can be controlled to obtain varying degrees of hardness, solubility in organic solvents, and thermosetting properties by which, upon removal of the solvent vehicle an insoluble and infusible resinous condensation product is obtained, and in which every one of the above noted objectionable features is eliminated.

These advantages are attained in the practice of the invention by condensing urea and formaldehyde simultaneously with an alkyl urea containing at least four substituent carbon atoms and also with an aliphatic alcohol containing between 3 and 8 carbon atoms. It is not necessary that the aliphatic alcohol be present during the entire course of the condensation reaction, but it should be incorporated in the reaction mixture before reaction is entirely completed.

The simultaneous condensation of an aliphatic alcohol with urea and formaldehyde has heretofore been performed for the purpose of rendering the resulting condensation product soluble, at least temporarily, in organic solvents. The simultaneous condensation of urea and an alkyl urea containing at least four alkyl substituent carbon atoms has been performed for accomplishment of this same general function. In this sense, the use of an alkyl urea has afforded an alternative procedure to that of use of an aliphatic alcohol in the condensation reaction. In the practice of the present invention, these two means of rendering the resulting product soluble in organic solvents, instead of being used as alternatives to each other, are used simultaneously, with the result that a product is obtained which is distinct from that obtained in the use of either the alkyl urea or the alcohol separately to accomplish the solubilizing function. The fact that the alkyl urea and alcohol perform distinct functions is proved by the superiority of the products of the present invention to products obtained when either the alkyl urea or alcohol is used separately by condensing it with urea and formaldehyde. Varying proportions of the alkyl urea may be used in practice of the invention, a smaller proportion of the alkyl urea being used in cases in which the alkyl urea has a large number of substituent alkyl carbon atoms than in cases in which a smaller number of such atoms are present. In any case, if a thermosetting final product is to be attained, it is desirable that a smaller amount of the alkyl urea be present in the reaction mixture than would be necessary to produce the desired solubilizing effect if the aliphatic alcohol were absent from the reaction mixture. The presence of the alkyl urea in the reaction mixture assists in the solubilizing function and at the same time enables the operator to control the degree of hardness of the finished product after thermosetting or after removal of the alcohol and solvent vehicle, without entailing the limitation which would be involved if no aliphatic alcohol were present; to wit, without requiring the production of an undesirably soft product in order to render this product soluble in the organic solvent.

While we do not wish to be limited by any theoretical reasoning by way of explanation of the results attained in the practice of the invention, it will be evident from the following theoretical discussion that the process of the present invention is distinct, and produces a distinctive product, as compared with prior art processes in which an alkyl urea or an aliphatic alcohol is used alone to accomplish solubilization, and this theoretical discussion may be of assistance in facilitating understanding of the fundamental character of the invention.

When two molecules of urea react with one molecule of formaldehyde, a reaction occurs according to the following equation:

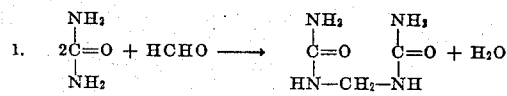

The resultant of Equation 1 may react in turn with a further molecule of urea and a molecule of formaldehyde as indicated by Equation 2:

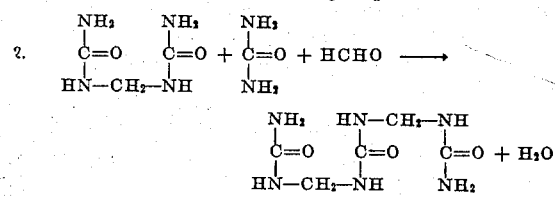

The NH₂ radicals of the resultant of Equation 2 may undergo further condensation with further molecules of formaldehyde and urea, and this process of combination and recombination may continue indefinitely, as the resulting molecule always contains two terminal NH₂ radicals capable of further combination with formaldehyde and urea. A molecule resulting from considerable further condensation is indicated at 3.

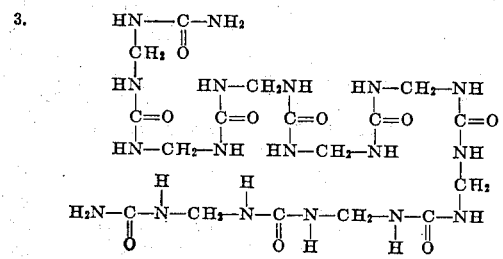

It is believed that the hardness of the resulting resin, and the tendency of the resin to become brittle and crack, are due to continued condensation to form a molecule of very great length.

The condensation reaction by which butyl urea (or other alkyl urea) is reacted with formaldehyde may be represented by Equation 4.

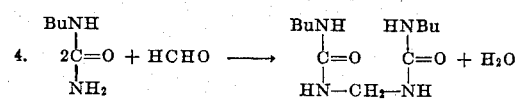

By contrasting Equation 4 with Equation 1, it will be seen that the resultants are distinguished by the fact that the terminal NH₂ radical of the resultant of Equation 1 is replaced by an NHBu radical in Equation 4. As a consequence of this fact the resultant of Equation 4 is much less reactive than that of Equation 1, and the molecular weights of products of this type of reaction are much smaller than those of repeated condensation of Equations 1 and 2. It is believed that this fact accounts for the distinctions between these two types of condensation products, such as the differences in solubility and physical condition, the condensation product of Equation 4 being a viscous liquid soluble in most organic solvents.

When a single molecule of urea and a single molecule of butyl urea react with formaldehyde, the reaction may be represented by Equation 5.

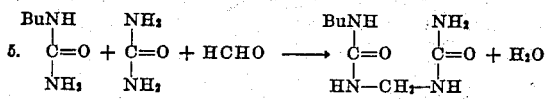

The NH₂ radical of the resultant of this equation may react with further formaldehyde and urea to produce a product of higher condensation, as illustrated by Equation 6.

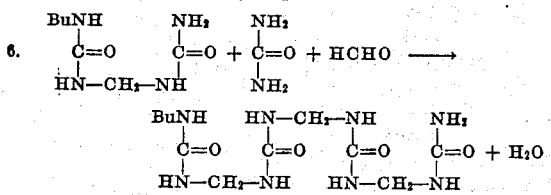

Alternatively, the resultant of Equation 5 may react with further formaldehyde and alkyl urea to produce the following compound.

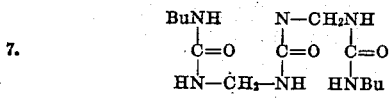

It will be seen that the resultant of Equation 6 is capable of further condensation, at the NH₂ radical, with further urea or alkyl urea, and that further condensation with urea produces a compound which is sufficiently reactive to undergo still further condensation with simple urea indefinitely. If, on the other hand, the resultant of Equation 5 is reacted with butyl urea, a compound such as indicated at 7 is produced, which contains no NH₂ radical, and hence cannot be readily reacted with formaldehyde and urea or butyl urea. Similarly, if at any stage of the cross condensation of formaldehyde with urea and butyl urea, formaldehyde and butyl urea are condensed with a resultant of a previous reaction which contains only a single NH₂ radical, the product of the last reaction will contain no such radical, with the result that it will be relatively unreactive. This is illustrated by Equation 8.

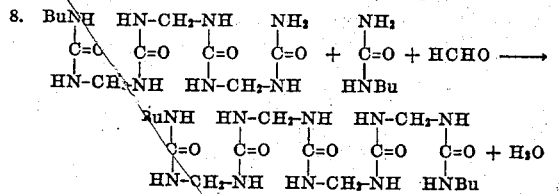

From the above discussion, it is apparent that, by cross-condensing formaldehyde with urea and butyl urea, products may be obtained of longer molecular weight and lower proportionate butyl radical content than that of Equation 4, but of lower molecular weight than those of condensation of simple urea with formaldehyde. The products of such cross-condensation may be made to vary in average molecular weight and solubility by varying the ratio of butyl urea to urea, higher proportions of butyl urea giving more soluble and softer condensation products, of lower molecular weight. One difficulty with such cross-condensation products consists in the fact that, in order to obtain a product of the desired solubility in a particular solvent, it is necessary to incorporate in the reaction mixture a proportion of alkyl urea which is so large as to produce an undesirably soft or liquid product.

It has heretofore been proposed that urea be reacted with formaldehyde and with an aliphatic alcohol to produce a condensation product which may be dissolved in an organic solvent, such as an aromatic hydrocarbon or an alcohol, but which is rendered insoluble and infusible (thermoset) by the application of heat and removal of the solvent. The initial reaction by which the soluble resinous condensation product is formed may be represented by the following equation:

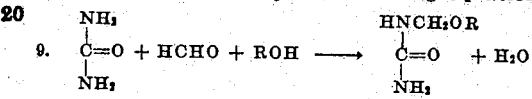

Two molecules of the resultant of Equation 9 may combine with each other upon application of heat, as follows:

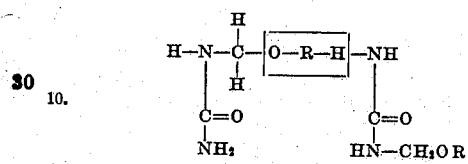

From the nature of the polymerization reaction illustrated at 10, it will be evident that the CH₂OR radical of the resulting compound is capable of being further condensed with the NH₂ radical of the resultant of Equation 9 or 10, with elimination of an alcohol, and that the NH₂ radical of the compound of 10 is capable of being further condensed with the CH₂OR radical of Equation 9 or 10. Since the resulting polymer has a CH₂OR radical and an NH₂ radical, regardless of the extent of polymerization, it will be seen that the polymerization reaction may continue indefinitely. It is believed that this indefinite continuation of polymerization is responsible for some of the undesirable qualities of this type of condensation product, as noted above.

It is believed that the condensation reactions of the present invention, while having an analogy to those illustrated above, are essentially distinct from any of them. Let us consider for example, a simple reaction in which urea, an alkyl urea, formaldehyde and an aliphatic alcohol are condensed together, as represented by the following equation:

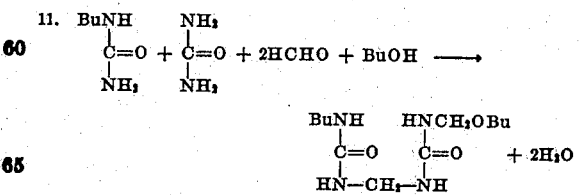

At the same time, various combinations of the reactions of 1-10 above are taking place, such as those of Equations 9 and 6. It will be evident that, upon removal of alcohol from the resultant of Equation 11 by heating, the resulting compound may be further condensed with compounds containing NH₂ radicals of Equations 1-10, and that such condensation may continue indefinitely so long as compounds containing CH₂OR and NH₂ radicals continue to be present for condensation with each other. When, however, the resultant of Equation 11 is heated with the resultant of Equation 4, the resulting condensation product will be relatively unreactive, as it will contain neither an NH₂ radical nor a CH₂OR radical. As a consequence of these facts, resultant mixtures formed in accordance with the invention, when heated to drive off the solvent and cause further condensation, undergo limited further condensation instead of the unlimited condensation of Equation 10. The resulting products will be of lower molecular weight than those of Equation 10, and they will be softer, due to the retention of the alkyl radical in the final product. By varying the ratio of alkyl urea to urea, various degrees of hardness of the final thermoset product can be attained. While it is possible, by increasing the ratio of alkyl urea to urea, to produce a condensation product which does not lose its solubility even upon heating, the preferred products of the invention are made from reaction mixtures which contain a sufficiently high proportion of simple urea to render the product thermosetting; i. e., solid and insoluble after the application of heat.

We prefer to use monohydric aliphatic alcohols containing between 3 and 8 carbon atoms in the practice of the invention, and to use alkyl ureas containing between 4 and 12 carbon atoms in the substituent alkyl radical or radicals. We prefer to employ a ratio of urea to alkyl urea in the reaction mixture such that the urea constitutes at least 30% by weight of the total quantity of urea and alkyl urea present, and it may in some cases be necessary to include more than 30% of urea in order to obtain the desired thermosetting product, the proportion of urea required to attain this condition depending to a large extent upon the carbon content of the substituent alkyl radicals of the alkyl urea.

In the preferred practice of the invention, the mixture of alkyl urea and urea, which may contain, for example, 30% alkyl urea and 70% urea, is first condensed with formaldehyde in the presence of an acid or alkaline catalyst. Thus, the reaction mixture may be subjected to preliminary reaction in the presence of acetic acid as a catalyst, and the aliphatic alcohol employed to improve the solubility of the product may be included in the reaction mixture at the beginning of the reaction, or may be introduced at a subsequent stage. For example, a mixture of butyl urea, urea and formaldehyde may be reacted, and the water of reaction may thereafter be removed under sub-atmospheric pressure until an essentially anhydrous product is obtained. The product can then be dissolved in the aliphatic alcohol and applied as a coating or in other connections. In cases in which it is desired that the product be soluble in aromatic hydrocarbons, however, it is necessary to boil the mixture resulting from addition of the alcohol for a few minutes after solution is effected. If this is done, the resulting product will be found to be waterwhite, stable, aromatic hydrocarbon soluble, and heat hardenable.

*Example I*

752 parts of 37% aqueous formaldehyde solution and 21 parts of ammonium hydroxide were charged into a flask equipped with thermometer well, stirrer and reflux condenser. This mixture was heated until the temperature reached 90° C., and 147 parts of butyl urea were added slowly, allowing each portion to react to yield a clear solution before additional portions were added. 53 parts of urea were then charged in a manner similar to the butyl urea, the mass being reacted at a temperature between 89 and 92° C. for 45 minutes. The resulting reaction mixture was then subjected to distillation at 30 mm. pressure and 70° C in order to remove water. The resulting product was a viscous syrup. To this syrup, 3 parts of 93% acetic acid, and a quantity of butyl alcohol equal to the weight of the syrup were added. The mixture was heated to 90° C. while stirring until complete solution in the butyl alcohol was attained. The resulting solution containing approximately 50% of solids in the butyl alcohol, was found to be soluble in alcohols and aromatic hydrocarbons, and was compatible with nitro-cellulose and alkyd and other resins. When applied as a coating and baked, the resulting baked product became insoluble in aromatic hydrocarbons.

*Example II*

190 parts of butyl urea were charged into a vessel equipped with a stirrer, thermometer well, reflux column and decanter. 232 parts of 37% aqueous formaldehyde solution and 0.5 parts of 93% acetic acid and 150 parts of N-butyl alcohol were added and the mass was refluxed for one hour. 25 parts of toluene were added and the water was removed by azeotropic distillation. Sufficient butyl alcohol was added to form a 50% solution of the resulting solids. The resulting product was found to be clear, stable and soluble in aromatic hydrocarbons and alcohols. Baked films were slightly tacky, thermoplastic and easily dissolved in the original solvent.

*Example III*

140 parts of butyl urea, 60 parts of urea, 405 parts of 37% aqueous formaldehyde solution, 2 parts of 93% acetic acid and 300 parts of N-butyl alcohol were processed in a manner similar to Example II. The resulting product was clear and stable. Baked films were thermoplastic, but the addition of 0.5% of lactic acid as an accelerator rendered the film thermosetting and insoluble in organic solvents.

*Example IV*

200 parts of butyl urea were dissolved in 930 parts of 37% of aqueous formaldehyde solution and 5 parts of acetic acid, and 750 parts of N-butyl alcohol were added. This mixture was heated to 90° C., and 200 parts of urea were added slowly while stirring, each portion being allowed to yield a clear solution before additional urea was added. This material was processed in a manner similar to that of Example II. The resulting product was found to be clear and stable. Baked films were relatively hard and insoluble in organic solvents.

*Example V*

373.5 parts of 37% aqueous formaldehyde solution, 10 parts of ammonium hydroxide and 264 parts of primary normal amyl alcohol were placed in a 5 liter flask equipped with a reflux condenser and decanter. This mixture was heated to a temperature of 90° C., and 116 parts of butyl urea and 60 parts of urea were then added slowly, permitting each added portion to yield a clear solution before further quantities were added. The reactants were refluxed for onehalf hour and 20 parts of toluene were then added. The resulting product was then dehydrated azeotropically until 271.2 parts of water were collected. The resulting resin (507.4 parts) was a clear water-white product infinitely soluble in aromatic hydrocarbons and alcohols, and compatible with alkyd and other types of resin. Baked films were water resistant and extremely hard and brittle.

Example VI 216 parts of 37% aqueous formaldehyde solution, 222 parts of butanol, 5 parts of ammonium hydroxide, 35 parts of urea, 65 parts of tertiary amyl urea and 20 parts of toluene were processed in a manner similar to that described above in Example V. 314.2 parts of a clear, slightly straw colored product containing 51.7% solids were obtained. The resulting resin was found to be infinitely soluble in hydrocarbon solvents and alcohols and compatible with alkyd and other types of resin. Baked films were extremely hard and brittle.

Various modifications are possible within the scope of the invention, and we do not wish to be limited except by the scope of the following claims.

We claim:

1. In the manufacture of condensation products by reaction of urea and urea derivatives with formaldehyde, the process comprising applying heat to condense together a mono-alkyl urea containing at least four substituent carbon atoms in the alkyl radical, urea, a substantial quantity of an unsubstituted monohydric aliphatic alcohol containing between 3 and 8 carbon atoms inclusive, and formaldehyde, the weight ratio of urea to alkyl urea being between 3:7 and 7:3, and the quantity of monohydric aliphatic alcohol used being in excess of the total quantity of urea and alkyl urea present in the reaction mixture.

2. A condensation product prepared by the process set forth in claim 1.

PAUL D. MORTON.
JOHN F. OLIN.